(12) United States Patent
Laifenfeld et al.

(10) Patent No.: US 10,103,780 B1
(45) Date of Patent: Oct. 16, 2018

(54) DUAL MODE COMMUNICATION OVER AUTOMOTIVE POWER LINES

(71) Applicant: GM GLOBAL TECHNOLOGY OPERATIONS LLC, Detroit, MI (US)

(72) Inventors: Moshe Laifenfeld, Haifa (IL); Yohay Buchbut, Pardes Hanna (IL); Tal Philosof, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/475,338

(22) Filed: Mar. 31, 2017

(51) Int. Cl.
  *H04B 3/54* (2006.01)
  *H04L 29/08* (2006.01)
  *H04L 5/00* (2006.01)

(52) U.S. Cl.
  CPC ........... *H04B 3/542* (2013.01); *H04L 5/0007* (2013.01); *H04L 67/12* (2013.01)

(58) Field of Classification Search
  CPC ........ H04B 3/542; H04L 5/0007; H04L 67/12
  See application file for complete search history.

(56) References Cited

U.S. PATENT DOCUMENTS

| | | | | |
|---|---|---|---|---|
| 7,920,585 B2* | 4/2011 | Mizutani | ................ | H04B 3/548 370/208 |
| 8,767,867 B1* | 7/2014 | Castor-Perry | ........... | H04L 27/12 363/21.1 |
| 8,830,039 B1* | 9/2014 | Egan | ................... | B60L 11/1816 320/109 |
| 2003/0018422 A1* | 1/2003 | Akiyama | ............ | B60R 16/0315 701/48 |
| 2008/0298226 A1* | 12/2008 | Mizutani | ................ | H04B 3/548 370/208 |
| 2010/0146277 A1* | 6/2010 | Mochizuki | .............. | H04L 9/083 713/169 |
| 2010/0327796 A1* | 12/2010 | Koshobu | ................ | G05B 19/19 318/625 |
| 2012/0033722 A1* | 2/2012 | Varadarajan | ............. | H04B 3/46 375/227 |
| 2012/0091799 A1* | 4/2012 | Rofougaran | .............. | H02J 1/10 307/24 |
| 2012/0284441 A1* | 11/2012 | Landman | ............ | G06F 13/4295 710/110 |
| 2013/0003875 A1* | 1/2013 | Abad Molina | ....... | H04W 36/14 375/257 |
| 2013/0003877 A1* | 1/2013 | Karaoguz | ............. | H04W 36/14 375/257 |
| 2014/0223048 A1* | 8/2014 | Troeger | .............. | G06F 13/4286 710/106 |
| 2016/0352388 A1* | 12/2016 | Lane | ........................ | H04B 3/54 |
| 2016/0353410 A1* | 12/2016 | Wang | ................ | H04W 72/1289 |

* cited by examiner

*Primary Examiner* — Jaison Joseph
(74) *Attorney, Agent, or Firm* — Cantor Colburn LLP

(57) ABSTRACT

A system for communication over automotive power lines is described. The system includes a plurality of vehicle modules. Each of the vehicle modules includes a power line communication (PLC) module. A PLC network connects the power lines configured to carry electric power to the vehicle modules. The PLC processors enable the power lines to transmit data between the plurality of vehicle modules. The system also includes a master PLC processor configured to transmit data to one or more of the plurality of vehicle modules via one of two selectable protocols that include a multiple frequency channel communication protocol and a multiple input multiple output (MIMO) communication protocol.

20 Claims, 2 Drawing Sheets

DUAL MODE COMMUNICATION OVER AUTOMOTIVE POWER LINES

INTRODUCTION

The subject disclosure relates to vehicles, and more particularly to dual mode local interconnect network (LIN)/controller area network (CAN) communication over automotive power lines.

Power-line communication (PLC) generally refers to technologies in which a power line that is designed to carry electric power also carries data between two nodes in a network. Power-line communications systems operate by adding a modulated carrier signal to the wiring system. PLC can eliminate the need for installation of dedicated communication lines when power lines connect the control modules.

Recently, power-line communication has been proposed for use in vehicles to reduce the number of wires needed in a vehicle by sending communication signals over the vehicle's existing power-lines. PLC technology enables communication data and control information over existing direct current (DC) battery power-lines. PLC in vehicles can reduce and/or eliminate the need for wiring that would normally be included in the vehicle to carry communication information. Vehicle cost and weight can therefore be reduced.

Current DC power line communication concepts transmit data on a single fixed frequency. However, data error rates outside of a permissible range can result due to interference and channel conditions caused by operation of one or more vehicle systems at the same time. Current low cost DC power line communication systems in automobiles are symmetric in nature (i.e., master and node have identical capabilities) and are narrowband in nature; where every LIN bus being replaced occupies a fixed frequency band. Experiments show, however, that not all frequency bands are supported by the vehicle distribution network, and predicting which bands are suitable for static frequency transmission (and which bands are not) is technically challenging, if not impractical.

Most LIN buses in an automobile's electrical architecture are driven by a small subset of ECUs operating as LIN masters that respectively drive multiple LIN buses. A body control module (BCM) is an example of a LIN master that drives multiple LIN buses. Such scenarios call for asymmetric design where the LIN master has significantly more computational capability than the end nodes. But the narrowband communications on LIN buses may experience interference and channel conditions when used for data transmission when other vehicle functions are performed on one or more of the LIN buses. Wideband technologies like orthogonal frequency-division multiplexing (OFDM) methods are resilient to channel conditions, however hardware and field implementation for OFDM can be cost prohibitive in vehicle PLC networks.

Accordingly, it is desirable to provide cost-effective systems for reliable and robust communication of multiple LIN/CAN buses over multiple power line paths, and further, over multiple frequency bands, that can be driven by a single master power line communication processor.

SUMMARY

In one exemplary embodiment, a system for communication over automotive power lines is described. The power line communication (PLC) system includes a plurality of vehicle modules each with a PLC processor, which are connected via power lines in a PLC network. The power lines are configured to carry electric power to the vehicle modules. The PLC processors enable the power lines to also transmit data between the plurality of vehicle modules. The system includes a master PLC processor configured to transmit data to one or more of the plurality of vehicle modules via one of two selectable protocols that include a multiple frequency channel communication protocol, and a multiple input multiple output (MIMO) communication protocol.

In another exemplary embodiment, a method for power line communication (PLC) in a vehicle includes transmitting data via a master PLC processor to one or more of a plurality of vehicle modules in the vehicle. The master PLC processor is configured to transmit the data via one of two selectable protocols that include a multiple frequency channel communication protocol, and a multiple input multiple output (MIMO) communication protocol.

In another exemplary embodiment, a vehicle includes a power line communication (PLC) system. The PLC system includes a plurality of vehicle modules each with a PLC module, which are connected via power lines in a PLC network. The power lines are configured to carry electric power to the vehicle modules. The PLC processors also enable the power lines to also transmit data between the plurality of vehicle modules. The vehicle includes a master PLC processor configured to transmit data to one or more of the plurality of vehicle modules via one of two selectable protocols that include a multiple frequency channel communication protocol, and a multiple input multiple output (MIMO) communication protocol.

In addition to one or more of the features described herein, in one embodiment the master PLC processor is configured to transmit the data using both of the multiple frequency channel communication protocol and the MIMO communication protocol, where the two protocols are user-selectable.

In another embodiment, the master PLC processor is configured to transmit the data using the multiple frequency channel communication protocol with frequency hopping on two or more frequency channels operating on the same power line.

In another embodiment, where the master PLC processor is configured to transmit the data using the multiple frequency channel communication protocol, the master PLC processor is configured to select a pseudo-orthogonal frequency sequence of two or more frequency channels. The frequency sequence includes a main transmission frequency and one or more frequencies that are not harmonics of the main transmission frequency. The master PLC processor transmits the data by frequency hopping on the two or more frequency channels based on the selected pseudo-orthogonal frequency sequence.

In another embodiment, where the master PLC processor is configured to transmit the data using the multiple frequency channel communication protocol, the master PLC processor is configured to transmit the data on a different frequency of the two or more frequency channels at a predetermined time interval between each of the frequency channels.

In another embodiment, where the master PLC processor is configured to transmit the data using the MIMO communication protocol, the master PLC processor is configured to select at least one power line channel based on a system response to a test signal transmitted on the power line channel.

In another embodiment, where the master PLC processor is configured to transmit the data using the MIMO communication protocol, the master PLC processor transmits a test signal on two or more power lines connected to the master PLC processor, and selects, based on the system response of the test signal, the at least one power line channel of the one or more power lines connected to the master PLC processor. The PLC processor transmits the data to one or more of the plurality of vehicle modules via the at least one selected power line channel.

In another embodiment, where the master PLC processor is configured to transmit the data using the MIMO communication protocol, the system response includes a signal attenuation of the test signal, and the master PLC processor selects the at least one power line based on a predetermined range of signal attenuations.

In another embodiment, where the master PLC processor is configured to transmit the data using the MIMO communication protocol, the system response includes a signal amplitude of the test signal, and the master PLC processor selects the at least one power line based on a predetermined range of signal amplitudes.

In another embodiment, where the master PLC processor is configured to transmit the data using the MIMO communication protocol, system response tested is changeable by a user to select the at least one power line based on a user-determined criterion.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
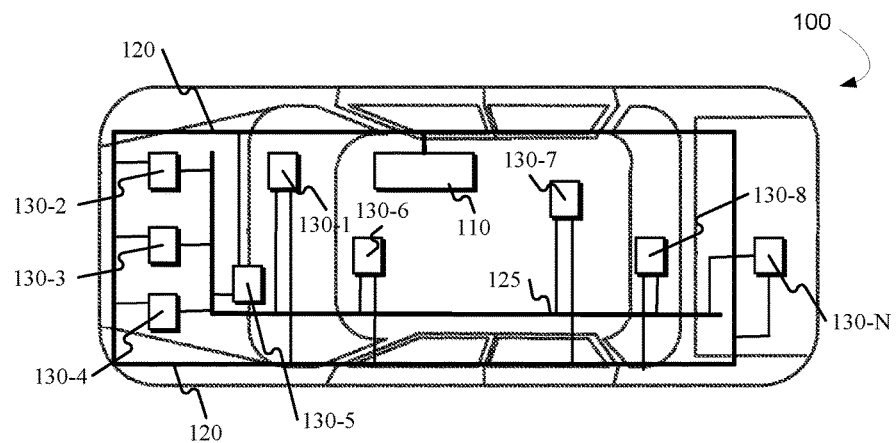
FIG. 1 illustrates a vehicle in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

More particularly, as used herein, a "vehicle module" refers to a controller module in a vehicle that controls vehicle systems, sub-systems, actuators, sensors, switches and the like. Each of the vehicle modules can perform a certain function or functions for controlling a certain vehicle system or sub-system, such as a vehicle body, engine, chassis, etc. Non-limiting examples of vehicle modules can include, for example, an Engine Control Unit (ECU) or Engine Control Module (ECM), Powertrain Control Module (PCM), a Transmission Control Module (TCM), a Body Control Module (BCM), an Extended Body Control Module (EBCM), a Passive Entry Passive Start (PEPS) module, a Power Window and Lock Control Module (PWLCM), an Electrical Parking Brake Control Module (EPBCM), a Door Switch Panel Module (DSPM), a Vehicle Communication Interface Module (VCIM), an Electronic Brake Control Module (EBCM), Vehicle Communication Module (VCM), etc.

As used herein, a power line (PL) refers to a transmission line (or a conductor) in a vehicle that carries electric power to vehicle modules. The power line can be, for example, a direct current (DC) battery power-line, an alternating current (AC) line (e.g., in an electric vehicle), or any other conventional transmission line that is in a vehicle, etc.).

FIG. 1 illustrates a vehicle 100 that includes a power source 110 (e.g., a vehicle battery), power lines 120 and a controller area network (CAN) bus 125 connecting a number of vehicle modules 130-1 . . . 130-N (collectively "vehicle modules 130"). Power lines 120 are configured in a power line communication network such that they are a part of CAN bus 125. Although this drawing illustrates nine vehicle modules 130-1 . . . 130-N, those skilled in the art will appreciate that this is simply one non-limiting example and that a vehicle can include any number of vehicle modules located throughout vehicle 100. Vehicle modules 130 are coupled to the CAN bus 125 via wired or wireless communication links for communication of information to and from the vehicle modules 130. Although not illustrated for simplicity, vehicle 100 may also include a number of hard-wired and wireless peripherals, such as sensors, switches, actuators, etc. Any suitable configuration of vehicle modules and peripherals can be employed.

Figure 2:
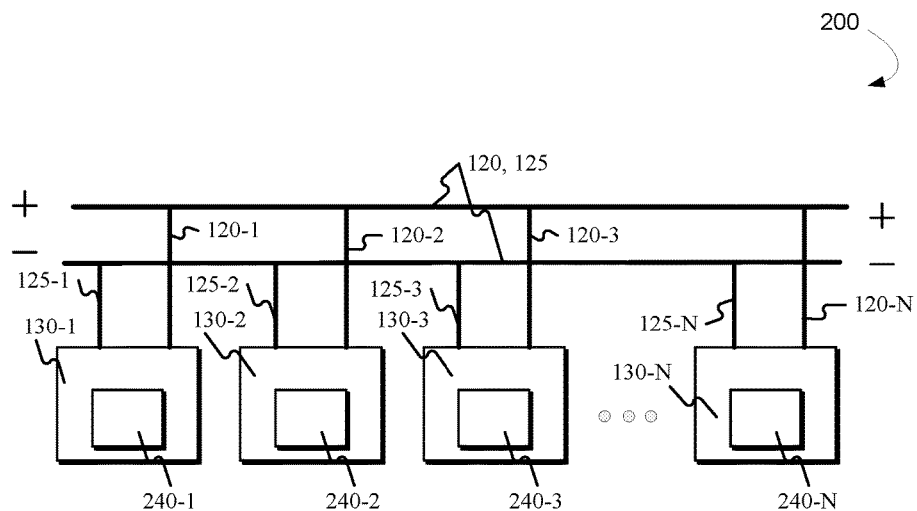
FIG. 2 is a simplified schematic block diagram of a vehicle communications network in accordance with various embodiments.

As shown in FIG. 2, a power line communication network 200 includes a power source (e.g., power source 110 which may be, for example, a vehicle battery), power lines 120-1 . . . 120-N (collectively "power lines 120"), an optional Controller Area Network (CAN) bus line 125 with optional bus lines 125-1 . . . 125-N (collectively "bus lines 125"), and vehicle modules 130-1 . . . 130-N (collectively "vehicle modules 130"). Power lines 120 are configured in a power line communication network such that they are a part of CAN bus 125.

In one non-limiting embodiment, bus line 125 may be a CAN bus that is complaint with any known CAN bus standard. As is known in the art, CAN bus may refer to a message-based protocol designed for automotive applications that allows microcontrollers, modules, and devices within a vehicle to communicate with each other without a host computer. It should be appreciated that a CAN uses differential signaling mechanisms for electrically transmitting information using two complementary signals. CANs send the same electrical signal as a differential pair of signals, each in its own conductor. The pair of conductors can be wires (typically twisted together) or traces on a circuit board in single-board CAN implementations. The receiving circuit responds to the electrical difference between the two signals rather than the difference between a single wire and ground. Although the schematics shown in FIG. 1 depicts a single wire connection on CAN buses 125, it should be appreciated that, as depicted in FIG. 2, embodiments having CANs include multiple wire connections between the vehicle modules.

Main power line 120 is electrically coupled to a power source (e.g., 110 as shown in FIG. 1), such as a vehicle battery. Main power line 120 is coupled to the vehicle modules 130 via power lines 120. This way power lines 120 can provide electrical power to the various vehicle modules 130 of vehicle 100 from power source 110. For example, vehicle module 130-1 couples to main power line 120 via branch power line 120-1. In accordance with the disclosed embodiments, each of vehicle modules 130 can include a power line communication module (e.g., PLC processors 240-1 to 240-N) that allows a power line communication network to be implemented within the vehicle 100.

Aspects of the present disclosure involve dual mode communication over automotive powerlines in a LIN (Local Interconnect Network) and controller area network (CAN). Before discussing embodiments in greater detail, brief overviews of both LIN and CAN technologies are considered in the following paragraphs.

As used herein, LIN is a serial network protocol used for communication between components in vehicles. LIN is a broadcast serial network usually including up to 16 nodes (one master node and typically up to 15 slave nodes). All messages are initiated by the master node with at most one slave node replying to a given message identifier. The master node can also act as a slave by replying to its own messages. Because all communications are initiated by the master it is not necessary to implement a collision detection. The master and slaves are typically microcontrollers, but may be implemented in specialized hardware or ASICs in order to save cost, space, or power. Current automotive uses combine the low-cost efficiency of LIN and simple sensors to create small networks. Some embodiments may connect these sub-systems by a back-bone-network (e.g., CAN bus line 125).

As used herein, single-carrier frequency division multiple access (SC-FDMA) is a frequency-division multiple access communication technology. SC-FDMA deals with the assignment of multiple users (or in the present case, vehicle modules) to a shared communication resource. In telecommunications, SC-FDMA has drawn great attention as an attractive alternative to wideband technologies like orthogonal frequency-division multiplexing (OFDM), especially in the uplink communications where lower peak-to-average power ratio (PAPR) greatly benefits the mobile terminal in terms of transmit power efficiency and reduced cost of the power amplifier. For this reason, in the telecommunications industry, SC-FDMA has been adopted as the uplink multiple access scheme in non-automotive applications such as 3GPP Long Term Evolution (LTE), or Evolved UTRA (E-UTRA).

Although the performance gap of SC-FDMA in relation to OFDMA is small, SC-FDMA's advantage of low PAPR makes SC-FDMA desirable when transmitter power efficiency and cost are of paramount importance. In some exemplary embodiments, SC-FDMA is configured to use a narrow bandwidth while keeping error rates low in comparison to current PLC methods. This feature is due, at least in part, to localized mapping and distributed mapping features of SC-FDMA technology.

One distinguishing feature of SC-FDMA is that it leads to a single-carrier transmit signal, in contrast to OFDMA which is a multi-carrier transmission scheme that occupies a wide bandwidth. Subcarrier mapping can be classified into two types: localized mapping and distributed mapping. In localized mapping, the discrete Fourier transform (DFT) outputs are mapped to a subset of consecutive subcarriers, thereby confining them to only a fraction of the system bandwidth. In distributed mapping, the DFT outputs of the input data are assigned to subcarriers over the entire bandwidth, non-continuously, resulting in zero amplitude for the remaining subcarriers.

Owing to its inherent single carrier structure, one prominent advantage of SC-FDMA over OFDM is that the transmit signal of SC-FDMA has a lower peak-to-average power ratio (PAPR), resulting in relaxed design parameters in the transmit path of a subscriber unit (e.g., a receiving vehicle module). According to embodiments described herein, the relaxed design parameters can benefit the OEM by reducing design complexity and overall system cost.

In SC-FDMA, equalization is achieved on the receiver side, after the DFT calculation, by multiplying each Fourier coefficient by a complex number. Thus, frequency-selective fading and phase distortion is more readily counteracted. The advantage here is that frequency domain equalization using FFTs requires less computation than conventional time-domain equalization. Accordingly, many current vehicle modules like BCMs are computationally capable of performing SC-FDMA. One benefit here is stable data transmission and improved error rates over current implementations of PLC.

Figure 3:
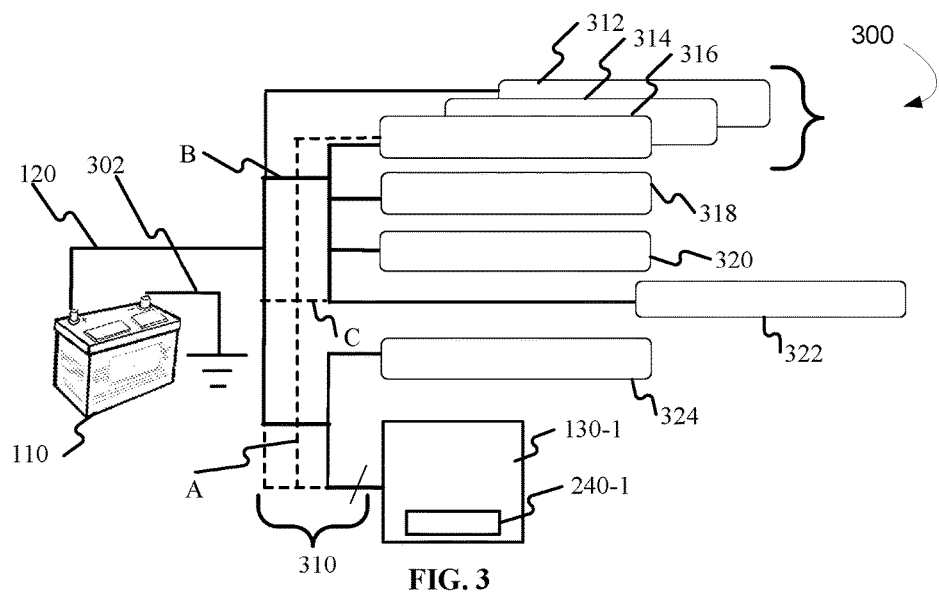
FIG. 3 is another simplified schematic block diagram of a power line communication (PLC) network in accordance with various embodiments.

After the prior discussion of underlying communication network technologies, embodiments will now be described in greater detail. FIG. 3 is a simplified schematic block diagram of a power line communication (PLC) system 300 in accordance with various embodiments. PLC system 300 includes a DC power line 120. As previously mentioned, current DC power line communication are symmetric in nature (i.e., master and node have identical capabilities). However most of the LIN buses in the vehicle's electrical architecture are driven by a small subset of ECUs that drive multiple LIN buses. For example, a body control module (BCM) is an example of a LIN master that drives multiple LIN buses (e.g., 16 or more in some BCMs). Such scenarios call for asymmetric design where the LIN master is much more computationally capable than the end nodes. Adding the fact that most of these LIN masters are also powered by multiple power lines (such as, for example, 8 power lines in the case of some BCMs) then the master transceiver becomes a Multiple Input/Multiple Output (MIMO) receiver that can increase reliability and robustness of the different LIN networks it drives by diversifying its transmission over the different paths and different frequencies. According to some embodiments, the nodes can be populated with the common narrow band LIN transceivers (shown in FIG. 3 as seven transceivers 312, 314, 316, 318, 320, 322, and 324) that keep the overall cost of the system compatible with the wiring costs and existing LIN topologies in currently manufactured automobiles.

PLC system 300 can be viewed as a communication system that has many input and outputs. System 300 includes power lines 120 connected to a power source 110, a ground network 302, and various loads (not shown) within the vehicle. System 300 includes a vehicle module 130-1 configured as a LIN master. Vehicle module 130-1 may be a master module to various narrow band transceivers 312-324, which may be configured to control various aspects of vehicle 100 such as, for example, lights, sensors, locks, motors, etc. Although seven transceivers 312-324 are shown, is should be appreciated that system 300 may include any number of transceivers. Transceivers 312-324 may be any one or more of vehicle modules 130-2 . . . 130-N.

Referring again to FIG. 2 in conjunction with FIG. 3, according to one embodiment, vehicle module 130-1 is configured as a LIN master node and includes a master PLC processor 240-1. PLC master processor 240-1 is configured to perform various processing steps of embodiments described herein. Master PLC processor 240-1 is in direct communication with power lines 120 via multiple input and output channels 310. Input and output channels 310 connect PLC master processor 240-1 to power lines 120 (as shown in FIG. 2). Although depicted as a single I/O, input and output channels 310 can have any number of output leads (typically 8, 16, etc.).

According to embodiments, PLC master processor 240-1 is a vehicle module (e.g., any one or more of vehicle modules 130-1 . . . 130-N). Vehicle module 130-1 may be, for example, a BCM functioning as a main computer in a vehicle cabin. In most modern automobile power distribution architectures, signals are communicable across all subsystems in the vehicle power distribution system. That is to say, a continuity test would indicate that all vehicle components, vehicle modules, etc., are connected together in some way via the power distribution system. In one embodiment, input and output channels 310 contain 8 (or more) wires for positive power communication with transceivers 312-324. For example, all of input and output channels 310 may be 12 V positive input power lines. The number and voltage of input and output channels 310 can vary by application.

In an exemplary I/O where vehicle module 130-1 is configured as a LIN master, vehicle module includes 8 inputs and outputs, there are potentially 8 different channels of communication by which the system may transmit data using the multiple frequency channel communication (MIMO) protocol.

Vehicle module 130-1 as depicted in FIG. 3 can communicate data to multiple LIN networks (e.g., any of vehicle modules 130-2 . . . 130-N). For example, vehicle module 130-1 may be configured as a LIN master to LIN transceivers 312-314. LIN transceivers 312-324 are all connected either directly or indirectly to one another and to vehicle module 130-1.

Accordingly, in one embodiment, LIN transceivers 312-324 may be connected, either directly or indirectly, to any number of the LIN lines (input and output channels 310) operatively connected to vehicle module 130-1. For example, one transceiver 312 could be a sunroof controller, transceiver 314 could be an auxiliary alarm sensor, and transceiver 316 could be a rain/light sensing module. Accordingly, if vehicle module 130-1 sends a signal on a frequency subcarrier $f_1$ intended for only one of the three transceivers (the sunroof transceiver 312), the signal is simultaneously sent to all three transceivers 312, 314, and 316. If, at the same time the transmission is sent, it begins to rain and rain sensing module 316 transmits a signal intended for receipt by vehicle module 130-1, this may cause interference to the signal transmission intended for sunroof transceiver 312. The inverse may also be true, where a signal intended to transmit to vehicle module 130-1 indicative of rain may not be heard by vehicle module 130-1 because of interference by the signal sent to transceiver 312.

According to embodiments of the present disclosure, vehicle module 130-1 is configured to transmit data to one or more of the plurality of vehicle modules (transceivers) 312-324 via SC-FDMA combined with one of two selectable protocols: a multiple frequency channel communication protocol (that implements frequency hopping) and a multiple input multiple output (MIMO) communication protocol (that tests various signal paths and picks the most optimal channel(s) based on a test signal response).

The first of the two selectable protocols includes frequency hopping with the multiple frequency channel communication protocol. With this technique, master PLC processor 240-1 can transmit data using one or more sub-carrier frequencies that are not harmonics of the main carrier frequency. By signal hopping, the processor can simultaneously transmit data across the same power lines (e.g., powerlines 120) without mutual or unilateral interference.

According to another embodiment, interference can be avoided using the second independent technique, referred to herein as the MIMO communication protocol. Using the MIMO protocol, vehicle module 130-1 simultaneously transmits the same signal on different channels with the different frequencies.

In one aspect, master PLC processor 240-1 is configured to transmit the data using both of the multiple frequency channel communication protocol and the MIMO communication protocol, and a user (e.g., an OEM or other manufacturer) can select the one of the two selectable protocols.

According to one or more embodiments of the present disclosure, any number of vehicle modules 130-1 . . . 110-N may be a LIN master PLC processor that is configured to transmit data using both of the MIMO communication protocol and the multiple frequency channel communication protocol. Many current vehicle modules (e.g., a BCM) are computationally suited for performing narrowband communication like SC-FDMA implemented through the MIMO communications and multiple frequency channel communication protocols, as described herein.

Each of the two selectable protocols will now be considered in greater detail, beginning first with the MIMO communication protocol. Referring again to FIG. 3, when selectively configured to implement the MIMO protocol, vehicle module 130-1 tests several possible paths for signal transmission and picks one or more of the best transmission paths (of channels 310) through which the signal is transmitted. Master processor 240-1 then selects at least one power line channel of channels 310 based on an observed system response to a test signal transmitted on each of the power line channels.

For example, in one exemplary embodiment, master PLC processor 240-1 transmits a test signal on two or more channels 310 directly connected to master PLC processor 240-1. A test signal may be any type of suitable test signal know in the art for testing data transmission system response. The test signal may be configurable by an end user to evaluate various signal paths according to any predetermined test criterion. For example, as shown in FIG. 3, the test signal could test channels associated with all three of signal paths A, B, and C to determine the best possible power line data channel for transmission to transceiver 316. The best possible path is implementation-specific and user selected based on a desired system response characteristic. According to embodiments, PLC master processor 240-1 observes the system response to the test signal(s) transmitted, and selects one or more power line channels A, B, and C from the tested channels 310 based on the system responses of the test signal. Accordingly, PLC master processor 240-1 will transmit the data to one or more of the plurality of vehicle modules 130-1 . . . 130-N via the at least one selected power line channel.

The criterion by which master PLC processor 240-1 selects the one or more channels for data transmission can vary by application. In one aspect, the master module is configured with both the physical layer and software layer for implementing any number of user-selected options for selecting communication channels for transmission. For example, master PLC processor 240-1 can be configured for PLC selective to the MIMO communication protocol, where an end user (e.g., an automotive manufacturer implementing system 300 in an automobile) programs the criterion by which PLC master processor 240-1 selects one or more channels for data transmission. In one embodiment, master PLC processor 240-1 is configurable to select the at least one power line among channels 310 based on a predetermined range of signal attenuations. In another aspect, master PLC processor 240-1 selects the shortest attenuation of all system responses subsequent to sending the test signal through channels 310.

In another embodiment, master PLC processor 240-1 is configured to select the power line(s) or route for data transmission based on signal strength by comparing the system response to the test signal to a predetermined range of signal amplitudes. In the present example, master PLC processor 240-1 selects the channel having the highest amplitude among the received system responses. In another aspect, a particular signal strength is optimal for an application, and the master PLC selects an amplitude that falls within the predetermined range of signal amplitudes that could be considered optimal for that application.

Although any number of criteria for power line selection and configurations are contemplated, one aspect of exemplary embodiments is that the physical layer and the software layer necessary for user selection are present for the desired system response to be changeable by a user. Accordingly, the user may select the criterion by which the one or more power lines are selected from channels 310. In one aspect, the user selects the criterion via a software interface configured to customize master PLC processor 240-1. Predetermined ranges of amplitude, attenuation, etc., are omitted in the present exemplary embodiments. It is appreciated that particular ranges of criteria by which a communication channel may be selected by master PLC processor 240-1 are application-specific.

Now considering the second selectable protocol according to another exemplary embodiment, master PLC processor 240-1 is also configured to transmit the data using the multiple frequency channel communication protocol by frequency hopping on two or more frequency channels operating on the same power line. As briefly explained above, all power lines in modern vehicle power distribution architectures are connected in some aspect. Therefore, interference is possible in the power distribution system from any operable system connected to the power distribution network. For example, a vehicle power distribution system may experience very short narrow interference in time and in frequency due to an intermittent power signal or response such as operation of the window wiper motors. The system may not be able to transmit anything on a particular interfering frequency (e.g., 5 MHz) when the wipers are in operation. Since current PLC systems operate on a fixed carrier frequency for each vehicle module (transceiver), the system may transmit to a vehicle module using a signal carrier operating at the same 5 MHz frequency, or a harmonic of the main 5 MHz frequency. In this example there is possibility that recipient won't hear the transmission due to interference from the 5 MHz wiper controller.

According to one exemplary embodiment of the present disclosure, vehicle module 130-1 may select several frequencies that would avoid interference with the main carrier frequency and all harmonics of the main frequency that would still interfere with the transmission. For any signals to transmit to transceivers 312, 314, and 316 without interruption using the same sub-carrier frequency $f_1$ (still using the previous example of 5 MHz), the signals must be sent spaced apart in time with respect to each of the multiple transmissions. A transmission of the same signal must be sent on the same sub-carrier frequency $f_1$ at intervals separated by two seconds (or some other predetermined interval of time) to avoid interference. For example, to avoid the 5 MHz frequency interference, master PLC processor 240-1 may transmit at a carrier frequency of 3 MHz, then hop to 6 MHz, 9 MHz, 12 MHz, etc. Each of the transmissions are also separated by a predetermined interval of time, which allows flexibility in signal transmission where an identical signal can transmit across the same channel to two different recipients receiving different carrier frequencies.

Figure 4:
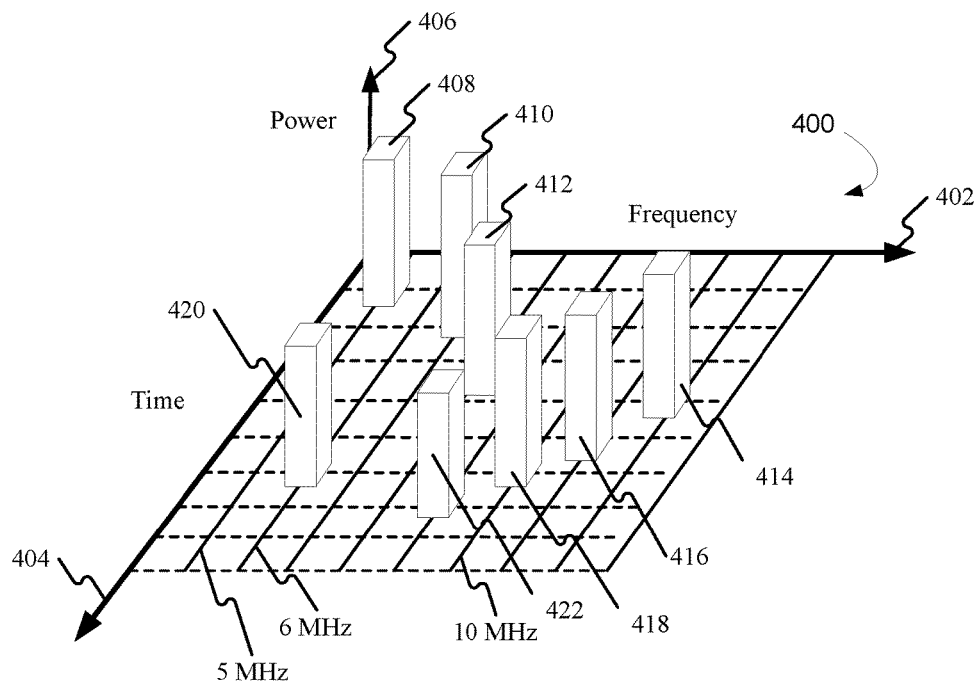
FIG. 4. is a graph illustrating frequency hopping in a multiple frequency channel communication protocol in accordance with various embodiments.

FIG. 4. depicts a graph 400 showing a plurality of signals 408, 410, 412, 414, 416, 418, 420, and 422 transmitted using a multiple frequency channel communication protocol, in accordance with various embodiments. FIG. 4 will be discussed in conjunction with FIG. 3. Referring briefly to FIG. 4, graph 400 illustrates signals 408-422 with respect to frequency 402 (in the x-axis), time 404 (in the y-axis), and power 406 (in the z-axis). Master PLC processor 240-1 is configured to transmit data (e.g., signals 408-422) using the multiple frequency channel communication protocol by frequency hopping on two or more frequency channels 402 operating on the same power line, according to exemplary embodiments. For the sake of explanation, all of signals 408-422 are operating on the same power line 120 (as shown in FIG. 3).

Referring now to FIG. 4, (and still keeping with the 5 MHz example), data signal 408 may transmit on a 5 MHz carrier signal. It is notable that signal 408 is spaced in time with all other signals (that is, no other transmission is sent at the same time as data signal 408). Accordingly, there exists spacing in time between all signal transmissions. Referring again to the windshield wiper motor example, if the windshield wiper motors are operating on the same 5 MHz frequency as data signal 408, master PLC processor 240-1 cannot transmit anything else at the same time at 5 MHz. Stated in another way, data signal 408 may become lost (unheard) or may experience another data error due to interference if transmitted at 5 MHz. With multiple other frequencies to select from, master PLC processor 240-1 can select, for example 7 MHz (data signal 410), 11 MHz (data signal 416), etc.

Data communications on the PLC also transmit on harmonics of the main transmission frequency. For example, if we transmit signal 408 at a carrier frequency of 5 MHz, any other signals at the same time must not be 5 MHz or a multiple (harmonic) of 5 MHz. As shown in graph 400, signal 418 is transmitted using a carrier signal of 10 MHz, which interferes with signal 408 if simultaneously transmitted. Accordingly, if master PLC processor 240-1 hops to 6 MHz as a carrier signal frequency, the system avoids interference with main 5 MHz frequency (and all of its harmonics at 10, 15, 20 MHz, etc.).

Continuing with the same example, if master PLC processor 240-1 transmits to transceiver 322 (as shown in FIG. 3) at 10 MHz, the transmission 418 is spaced in time from the signal 408 at the interfering frequency (and thus it does not interfere because of the separation in time). Accordingly, master PLC processor 240-1 is configured to transmit the data on a different frequency of the two or more frequency channels at a predetermined time interval between each of the frequency channels. A predetermined time interval may be, for example, any value such as 10 ms, 100 ms, 1 sec, 2 sec, etc. Any other signals that would be multiples of 5 (e.g., 15 MHz, 20 MHz, etc.) must also be time delineated. But if we jump to 6 MHz, it is not a harmonic of 5 MHz, master PLC processor 240-1 has avoided this interference from simultaneous transmission on power lines 120.

For example, signal 420 and 418 are transmitted simultaneously to transceivers 322 and 324 using the same power line 120. However, since signal 420 is transmitted at 6 MHz and signal 418 is transmitted at 10 MHz, there is no interference between the signals. Accordingly, master PLC processor 240-1 selects a pseudo-orthogonal frequency sequence of the two or more frequency channels, where the frequency sequence includes a main transmission frequency for signal 420 and one or more frequencies that are not harmonics of the main transmission frequency to simultaneously transmit signal 422 such as, for example, 10 MHz.

Without frequency hopping, as demonstrated above, system 300 has an option of transmitting on the same frequency but at different times. However, avoidance of interfering signals operating at the same frequency may not be consistently effective because the interfering signal may not be intermittent (i.e., it may be continuous) which means the time-divided transmissions are not guaranteed to be heard by the receiving module. Although there is difference in time shown between signals 408 and 420, there exists an implication that there may not be interference between the two signals. But what may not be known to master PLC processor 240-1 is the exact nature of the possible interfering signal (e.g., its tendency to be repeating, continuous, the period of repeating, etc.). To overcome this shortcoming, the multiple frequency channel communication protocol jumps in time and jumps in frequency (and thus, is pseudo-orthogonal).

Embodiments of the present disclosure provide power line communication of data over multiple LIN/CAN buses in automobiles. In aspects described herein, multiple power line channels can be dynamically chosen by a master vehicle module based on one or more user-configured criteria to add an additional layer of data integrity that fits all kinds of operational scenarios and equipment configurations. Exemplary embodiments also provide for transmission of data over multiple frequency bands, which adds an additional layer of flexibility and data error mitigation for robust and reliable data transmission over power lines. Moreover, the data is driven by a single master PLC processor having processing capability commensurate with vehicle modules currently in use, which makes widespread adoption both practical and cost effective.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system, comprising:
   a plurality of vehicle modules each comprising a power line communication (PLC) module;
   a PLC network comprising power lines configured to carry electric power to the vehicle modules, wherein the PLC processors enable the power lines to transmit data between the plurality of vehicle modules; and
   a master PLC processor of the plurality of PLC processors configured to transmit data to one or more of the plurality of vehicle modules via one of two selectable protocols comprising a multiple frequency channel communication protocol and a multiple input multiple output (MIMO) communication protocol;
   wherein the master PLC processor transmits a test signal on two or more power lines connected to the master PLC processor;
   selects at least one power line channel of the two or more power lines based on the test signal attenuation; and
   transmits the data to one or more of the plurality of vehicle modules via the at least one selected power line channel.

2. The system of claim 1, wherein the master PLC processor is configured to transmit the data using both of the multiple frequency channel communication protocol and the MIMO communication protocol, wherein the two protocols are user-selectable.

3. The system of claim 1, wherein the master PLC processor is configured to transmit the data using the multiple frequency channel communication protocol by frequency hopping on two or more frequency channels operating on the same power line.

4. The system of claim 3, wherein the master PLC processor is configured to:
   select a pseudo-orthogonal frequency sequence of the two or more frequency channels, wherein the frequency sequence comprises a main transmission frequency and one or more frequencies that are not harmonics of the main transmission frequency; and
   transmit the data by frequency hopping on the two or more frequency channels based on the selected pseudo-orthogonal frequency sequence.

5. The system of claim 4, wherein the master PLC processor is configured to transmit the data on a different frequency of the two or more frequency channels at a predetermined time interval between each of the frequency channels.

6. The system of claim 1, wherein the master PLC processor is configured to transmit the data using the MIMO communication protocol, wherein the processor is configured to select at least one power line channel based on a system response to a test signal transmitted on the power line channel.

7. The system of claim 6, wherein master PLC processor is configured to:
   transmit the test signal on the two or more power lines connected to the master PLC processor;
   select, based on the system response of the test signal, the at least one power line channel of the one or more power lines connected to the master PLC processor; and
   transmit the data to one or more of the plurality of vehicle modules via the at least one selected power line channel.

8. The system of claim 7, wherein the system response comprises a signal attenuation of the test signal, and the master PLC processor selects the at least one power line based on a predetermined range of signal attenuations.

9. The system of claim 7, wherein the system response comprises a signal amplitude of the test signal, and the master PLC processor selects the at least one power line based on a predetermined range of signal amplitudes.

10. The system of claim 7, wherein the system response tested is changeable by a user to select the at least one power line based on a user-determined criterion.

11. A method for PLC in a vehicle comprising:
    transmitting data, via a master PLC processor, to one or more of a plurality of vehicle modules in the vehicle via one of two selectable protocols comprising a multiple frequency channel communication protocol and a multiple input multiple output (MIMO) communication protocol;

wherein the master PLC processor transmits a test signal on two or more power lines connected to the master PLC processor;

selects at least one power line channel of the two or more power lines based on the test signal attenuation; and transmits the data to one or more of the plurality of vehicle modules via the at least one selected power line channel.

12. The method of claim 11, comprising:

transmitting the data using both of the multiple frequency channel communication protocol and the MIMO communication protocol, wherein the two protocols are user-selectable.

13. The method of claim 11, comprising:

transmitting the data selective to the multiple frequency channel communication protocol with frequency hopping on two or more frequency channels operating on the same power line.

14. The method of claim 13, comprising:

selecting, via the processor, a pseudo-orthogonal frequency sequence comprising the two or more frequency channels, wherein the frequency sequence comprises a main transmission frequency and one or more frequencies that are not harmonics of the main transmission frequency; and transmitting the data by frequency hopping on the two or more frequency channels based on the selected pseudo-orthogonal frequency sequence.

15. The method of claim 14, comprising:

transmitting the data on a different frequency of the two or more frequency channels at a predetermined time interval between each of the frequency channels.

16. The method of claim 11, wherein transmitting the data comprises:

transmitting the data using the MIMO communication protocol by selecting at least one power line channel based on a system response to a test signal transmitted on the power line channel.

17. The method of claim 16, comprising:

transmitting, via the processor, the test signal on the two or more power lines connected to the master PLC processor;

selecting, via the processor, based on the system response of the test signal, the at least one power line channel of the one or more power lines connected to the master PLC processor; and transmitting the data to one or more of the plurality of vehicle modules via the at least one selected power line channel.

18. The method of claim 17, wherein the system response comprises a signal attenuation of the test signal, and the selecting comprises selecting the at least one power line based on a predetermined range of signal attenuations.

19. The method of claim 17, wherein the system response comprises a signal amplitude of the test signal, and the master PLC processor selects the at least one power line based on a predetermined range of signal amplitudes.

20. A vehicle comprising a power line communication system comprising:

a plurality of vehicle modules each comprising a power line communication (PLC) module;

a PLC network comprising power lines configured to carry electric power to the vehicle modules, wherein the PLC processors enable the power lines to transmit data between the plurality of vehicle modules; and a master PLC processor of the plurality of PLC processors configured to:

transmit data to one or more of the plurality of vehicle modules via one of two selectable protocols comprising a multiple frequency channel communication protocol and a multiple input multiple output (MIMO) communication protocol;

wherein the master PLC processor transmits a test signal on two or more power lines connected to the master PLC processor;

selects at least one power line channel of the two or more power lines based on the test signal attenuation; and transmits the data to one or more of the plurality of vehicle modules via the at least one selected power line channel.

* * * * *